United States Patent
Johnson et al.

(10) Patent No.: US 10,109,846 B2
(45) Date of Patent: Oct. 23, 2018

(54) MIXED CATHODE MATERIAL WITH HIGH ENERGY DENSITY

(71) Applicant: Electrochem Solutions, Inc., Clarence, NY (US)

(72) Inventors: Arden P. Johnson, Arlington, MA (US); Alexander Kaplan, Providence, RI (US)

(73) Assignee: Electrochem Solutions, Inc., Clarence, NY (US)

(*) Notice: Subject to any disclaimer, the term of this patent is extended or adjusted under 35 U.S.C. 154(b) by 198 days.

(21) Appl. No.: 14/641,836

(22) Filed: Mar. 9, 2015

(65) Prior Publication Data

US 2015/0255784 A1 Sep. 10, 2015

Related U.S. Application Data

(60) Provisional application No. 61/949,319, filed on Mar. 7, 2014.

(51) Int. Cl.
| | |
|---|---|
| H01M 4/36 | (2006.01) |
| H01M 4/62 | (2006.01) |
| H01M 4/583 | (2010.01) |
| H01M 4/38 | (2006.01) |
| H01M 4/58 | (2010.01) |
| H01M 4/13 | (2010.01) |
| H01M 10/052 | (2010.01) |
| H01M 4/587 | (2010.01) |

(52) U.S. Cl.
CPC .......... *H01M 4/364* (2013.01); *H01M 4/13* (2013.01); *H01M 4/381* (2013.01); *H01M 4/5825* (2013.01); *H01M 4/5835* (2013.01); *H01M 4/623* (2013.01); *H01M 10/052* (2013.01); *H01M 4/587* (2013.01)

(58) Field of Classification Search
CPC combination set(s) only.
See application file for complete search history.

(56) References Cited

U.S. PATENT DOCUMENTS

| | | | |
|---|---|---|---|
| 5,180,642 A | 1/1993 | Weiss et al. | |
| 5,744,258 A | 4/1998 | Bai et al. | |
| 5,872,698 A | 2/1999 | Bai et al. | |
| 6,551,747 B1 | 4/2003 | Gan | |
| 6,909,915 B2 | 6/2005 | Greatbatch et al. | |
| 7,020,519 B2 | 3/2006 | Greatbatch et al. | |
| 7,079,893 B2 | 7/2006 | Greatbatch et al. | |
| 7,136,701 B2 | 11/2006 | Greatbatch et al. | |
| 7,598,002 B2 | 10/2009 | Gorkovenko et al. | |
| 8,153,307 B1 * | 4/2012 | Tanaka | H01M 10/0568 429/303 |
| 2002/0094479 A1 * | 7/2002 | Gan | H01M 4/13 429/212 |
| 2003/0054253 A1 | 3/2003 | Morishima et al. | |
| 2003/0082454 A1 | 5/2003 | Armand et al. | |
| 2008/0289171 A1 * | 11/2008 | Cheng | H01M 2/0207 29/623.1 |
| 2010/0086461 A1 | 4/2010 | Chung | |
| 2010/0310908 A1 * | 12/2010 | Zhang | H01M 4/364 429/90 |
| 2012/0164528 A1 * | 6/2012 | Xu | H01M 4/131 429/211 |
| 2013/0062573 A1 | 3/2013 | Lin et al. | |
| 2013/0095392 A1 | 4/2013 | Shin et al. | |
| 2013/0122379 A1 | 5/2013 | Hwang et al. | |
| 2013/0171502 A1 | 7/2013 | Chen et al. | |
| 2014/0186695 A1 * | 7/2014 | Moganty | H01M 4/1397 429/188 |
| 2014/0272584 A1 * | 9/2014 | Jiang | H01M 4/58 429/220 |
| 2015/0214526 A1 * | 7/2015 | Cristadoro | H01M 2/1653 429/231.1 |

FOREIGN PATENT DOCUMENTS

| | | |
|---|---|---|
| EP | 2360118 | 8/2011 |
| EP | 2541652 | 1/2013 |

* cited by examiner

*Primary Examiner* — Imran Akram
(74) *Attorney, Agent, or Firm* — Michael F. Scalise; Steven W. Winn

(57) ABSTRACT

The present invention relates to an electrochemical cell comprising an anode of a Group IA metal and a cathode of a composite material prepared from a first active cathode material of a transition metal phosphate mixed or added to a second active cathode material of a carbonaceous material. The cathode material of the present invention provides increased rate pulse performance compared to carbon monofluoride cathode material. In addition, the cathode material of the present invention is chemically stable which makes it particularly useful for applications that require increased rate capability in extreme environmental conditions such as those found in oil and gas exploration.

23 Claims, No Drawings

MIXED CATHODE MATERIAL WITH HIGH ENERGY DENSITY

CROSS-REFERENCE TO RELATED APPLICATION

This application claims priority from U.S. Provisional Application Ser. No. 61/949,319, filed Mar. 7, 2014.

TECHNICAL FIELD

This invention relates to the art of electrochemical cells, and more particularly, to a new and improved electrochemical cell, and a cathode therefore. The cell comprises a Group IA anode and a new composite metal cathode material. Still more particularly, the present invention is directed to a cathode material composition comprising a mixture of carbon monofluoride and a metal phosphate.

BACKGROUND OF THE INVENTION

Electrochemical cells provide electrical energy that powers a host of electronic devices that range from medical devices to electronic devices utilized in gas and oil exploration. Among these many devices powered by electrochemical cells are electronic devices such as pipeline inspection gauges that are used in down-hole petroleum exploration. Such devices generally require the delivery of a significant amount of current over long periods of time in relatively harsh environments. Thus, these devices typically require the use of electrochemical cells that comprise an increased delivery capacity and an increased rate of charge delivery. In addition, these cells must be able to safely operate in harsh environments that may comprise elevated temperatures, increased atmospheric pressures, caustic environments, explosive atmospheres, or combinations thereof.

As defined herein, "delivery capacity" is the maximum amount of electrical current that can be drawn from a cell under a specific set of conditions. The terms, "rate of charge delivery" and "rate capability" are defined herein as the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry.

Cathode chemistries such as carbon monofluoride (CFx) have a relatively high energy density compared to liquid cathode lithium-oxyhalide systems such as lithium-thionyl chloride, lithium-sulfuryl chloride and others. CFx cathode material is generally known to have a discharge capacity of about 875 mAh/g, which is well suited for powering electrical devices over long periods of time. However, electrochemical cells constructed with cathodes comprised of carbon monofluoride are generally considered to exhibit a relatively "low" rate capability. For example, electrochemical cells constructed with lithium anodes and CFx cathodes typically exhibit rate capabilities from about 0.5 mA/cm$^2$ to about 3 mA/cm$^2$. As such, electrochemical cells constructed with Li/CFx couples are generally well suited for powering electrical devices over long periods of time at a relatively low rate capability.

In contrast, electrochemical cells constructed with lithium anodes and cathodes comprising a liquid lithium-oxyhalide, such as lithium-thionyl chloride and lithium-sulfuryl chloride, are generally considered to exhibit a relatively "high" rate capability. Lithium cells constructed with liquid lithium-oxyhalide cathodes, in contrast to CFx cathodes, generally exhibit rate capabilities that range from about 0.5 mA/cm$^2$ to about 10 mA/cm$^2$. As such, lithium electrochemical cells constructed with cathodes comprised of liquid lithium-oxyhalide are generally well suited to power electronic devices used in down-hole oil and gas extraction that require an increased rate capability.

However, the liquid lithium-oxyhalide cathode material contained within these cells is generally considered to be caustic and may become volatile, principally if exposed to water. If such a cell comprising liquid lithium-oxyhalide were to rupture, the cathode material might cause a safety issue particularly within a petroleum rich environment. Therefore, what is desired is a cathode material and electrochemical cell thereof that comprises a "high" discharge capacity in addition to an increased rate capability that can safely operate in harsh environments. Such an electrochemical cell would be well suited for powering additional electronic devices that require an increased charge capacity with an increased discharge rate in harsh environments such as those found within petroleum wells.

The applicants, therefore, have developed a new CFx cathode material formulation and cathode thereof that provides a lithium electrochemical cell with increased rate capability. Specifically, the applicants have developed a cathode formulation in which a first cathode active material comprising a metallic phosphate is mixed with a second cathode active material comprising a carbonaceous material to thereby increase the cell's rate capability. Specifically, the addition of the metallic phosphate within the carbonaceous material structure is designed to increase the rate capability of the lithium cell. Thus, a cathode composed of a mixture of CFx and a metallic phosphate additive of the present invention when constructed within an electrochemical cell having a lithium anode is well suited for powering a variety of electrical devices that require a "high" discharge capacity with an increased rate capability. In addition, CFx is a solid and chemically stable cathode material that is generally considered to be less reactive than liquid-oxyhalide chemistries. Therefore, the possibility that the cathode may chemically react uncontrollably if exposed to environments outside the cell casing is reduced.

SUMMARY OF THE INVENTION

The present invention relates to an electrochemical cell comprising an anode of a Group IA metal and a cathode of a composite material prepared from a combination of metal salts. The cathode material of the present invention provides a cathode and an electrochemical cell thereof having an increased electrical capacity and improved rate capability.

Specifically, the present invention is of an electrochemical cell having a lithium anode and a cathode comprised of a mixture of a first cathode active material of a metallic phosphate and a second cathode active material of a carbonaceous material, particularly carbon monofluoride. The addition of the metallic phosphate is intended to increase the rate capability of a cell comprising a lithium anode. Preferred first cathode active materials include, but not limited to, iron (II) phosphate (Fe$_3$(PO$_4$)$_2$), iron (III) phosphate (FePO$_4$), lithium iron phosphate (LiFePO$_4$), cobalt phosphate (Co$_3$(PO$_4$)$_2$), lithium cobalt phosphate (LiCoPO$_4$), nickel phosphate (Ni$_3$(PO$_4$)$_2$), lithium nickel phosphate (LiNiPO$_4$), manganese phosphate (MnPO$_4$), lithium manganese phosphate (LiMnPO$_4$), and combinations thereof. The cathode material is preferably fabricated by mixing proportions of at least one of the first and second cathode active materials together. Alternatively, the cathode material may be fabricated in a thermal process in which stoichiometric proportions of at least one of the first cathode active materials is combined with the second active cathode material comprising carbon monofluoride with applied heat.

DETAILED DESCRIPTION OF THE PREFERRED EMBODIMENTS

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—Mg, Li—B and Li—Si—B alloys and intermetallic compounds. The preferred anode comprises lithium.

The form of the anode may vary, but typically, the anode is a thin sheet or foil of the anode metal, pressed or rolled on a metallic anode current collector, i.e., preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials and the electrochemical reaction at the cathode involves conversion of ions that migrate from the anode to the cathode into atomic or molecular forms. The solid cathode may comprise a first cathode active material of a metal phosphate, a lithiated metal phosphate or combinations thereof and a second cathode active material of a carbonaceous chemistry. The metal phosphate of the first active material has a relatively lower energy density but a relatively higher rate capability than the second cathode active material.

The first cathode active material is formed by the chemical addition, reaction, or otherwise intimate contact of various metal oxides, metal phosphates, metal sulfides and/or metal elements, preferably during thermal treatment, sol-gel formation, chemical vapor deposition, or hydrothermal synthesis in mixed states. The first cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. A preferred first cathode active material is a reaction product of stoichiometric proportions of at least fully lithiated to non-lithiated, iron phosphate, cobalt phosphate, nickel phosphate and manganese phosphate.

One preferred mixed metal phosphate is a transition metal phosphate having the general formula $Li_xMPO_4$ where x ranges from 0.01 to 1 and M is a transition metal selected from Groups IB to VIIB, VIIA, and VIII of the Periodic Table of Elements. By way of illustration, and in no way intended to be limiting, one exemplary first cathode active material comprises lithium iron phosphate having the general formula $Li_xFePO_4$ in any one of its many phases in the general formula x=0.01 to 1. Other preferred composite transition metal phosphate cathode materials include $Li_zCoPO_4$ wherein z=0.01 to 1, $Li_yPO_4$ wherein y=0.01 to 1 and $Li_rMnPO_4$ wherein r=0.01 to 1.

The mixed cathode design of the present invention further includes a second cathode active material of a relatively high energy density and a relatively low rate capability in comparison to the first cathode active material. The second cathode active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 to 1.2, and $(C_2F)_n$ wherein the n refers to the number of monomer units which can vary widely.

The first and second cathode active materials are combined to create a metal matrix material. In a preferred embodiment, the first cathode active material comprises from about 1 to about 90 weight percent of the total metal matrix material mixture. More preferably, the first cathode active material may comprise from about 25 to about 85 weight percent of the total metal matrix material mixture. Most preferably, the first cathode active material may comprise from about 40 to about 75 weight percent of the total metal matrix material mixture.

Alternatively, the first and second cathode active materials may be combined such that the amount of the first cathode active material, i.e., the metallic phosphate, and the second cathode active material, i.e., the carbonaceous active cathode material, have a molar ratio comprising from about 1-50 (metallic phosphate) to 50-99 (carbonaceous material). More preferably, the first and second cathode active materials may be combined such that the amount of the first cathode active material and the second cathode active material have a molar ratio comprising from about 10-30 (metallic phosphate) to 70-90 (carbonaceous material). For example, the cathode material of the present invention may be preferably formulated to comprise a molar ratio of 10:90 lithium iron phosphate to carbon monofluoride. Table I below delineates possible molar ratios of the respective first and second cathode active materials that may be used to formulate the metal matrix material of the cathode of the present invention.

TABLE I

| First Cathode Active Material (Molar Amount) | Second Cathode Active Material (Molar Amount) |
| --- | --- |
| 1 | 99 |
| 10 | 90 |
| 20 | 80 |
| 30 | 70 |
| 50 | 50 |

In a preferred embodiment, stoichiometric proportions of the first cathode active material and the second cathode active material are mixed together, such as by milling the two active materials together. Alternatively, stoichiometric proportions of the first cathode active material and the second cathode active material may be reacted together by chemical addition, reaction or otherwise intimate contact of the various materials thereof to form the metal matrix material of the cathode. The metal matrix material is preferably formed by the chemical addition, reaction, or otherwise intimate contact of at least the first and second cathode active materials, preferably during thermal treatment, sol-gel formation, chemical vapor deposition, or hydrothermal synthesis. In a preferred embodiment, the first and second cathode active materials are heated together above ambient temperature for about 1 to 5 hours. For example, the first and second cathode active materials may be heated together at a temperature ranging from about 50° C. to about 800° C. for about 1 to 5 hours.

In a broader sense, it is contemplated by the scope of the present invention that the first cathode active material is any material which increases the rate capability when combined with a fluorinated carbonaceous material. In addition to iron phosphate ($Fe_3(PO_4)_2$ or ($FePO_4$)), lithium iron phosphate ($LiFePO_4$), nickel phosphate ($Ni_3(PO_4)_2$), lithium nickel phosphate ($LiNiPO_4$), cobalt phosphate ($CO_3(PO_4)_2$), lithium cobalt phosphate ($LiCoPO_4$), manganese phosphate ($Mn_3(PO_4)_2$) and lithium manganese phosphate ($LiMnPO_4$) and mixtures thereof are useful as the first cathode active material.

Before fabrication into an electrode for incorporation into an electrochemical cell according to the present invention, the metal matrix material comprising the first and second cathode active materials is combined with a binder material such as a powdered fluoro-polymer, more preferably powdered polytetrafluoroethylene or powdered polyvinylidene flouride present to form a cathode active mixture. In a preferred embodiment, the binder material comprises about 1 to about 5 weight percent of the cathode active mixture. Further, up to about 10 weight percent of a conductive diluent is preferably added to the cathode active mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent metal matrix material.

Cathode components for incorporation into an electrochemical cell according to the present invention may be prepared by rolling, spreading or pressing the mixture of the first and second cathode active materials onto a suitable current collector selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The preferred current collector material is titanium, and most preferably the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

Such composite materials as those described above may be pressed into a cathode pellet with the aid of a suitable binder material such as a fluoro-resin powder, preferably polytetrafluoroethylene (PTFE) powder, and a material having electronic conductive characteristics such as graphite and/or carbon black. In some cases, no binder material or electronic conductor material is required to provide a similarly suitable cathode body.

For example, the metal matrix material is preferably mixed with a binder material such as a powdered fluoro-polymer, more preferably powdered polytetrafluoroethylene or powdered polyvinylidene fluoride present at about 1 to about 5 weight percent of the cathode active mixture. Further, up to about 10 weight percent of a conductive diluent is preferably added to the cathode active mixture to improve conductivity. Suitable materials for this purpose include acetylene black, carbon black and/or graphite or a metallic powder such as powdered nickel, aluminum, titanium, stainless steel, and mixtures thereof. The preferred cathode mixture thus includes a powdered fluoro-polymer binder present at a quantity of at least about 3 weight percent, a conductive diluent present at a quantity of at least about 3 weight percent and from about 80 to about 98 weight percent of the metal matrix material.

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention is preferably activated with a nonaqueous, ionically conductive electrolyte operatively associated with the anode and the cathode. The electrolyte serves as a medium for migration of ions between the anode and the cathode during electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The preferred electrolyte of the present invention comprises an inorganic salt having the general formula $YAF_6$ wherein Y is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. Pat. No. 5,580,683, which is assigned to the assignee of the present invention and incorporated herein by reference. In the present invention, the preferred electrolyte is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms. It is observed that the electrochemical cell of this invention has a wide operating temperature range of about −20° C. to +200° C. Advantages of the cathode material according to the present invention include a high delivered capacity, an increased rate and reduced direct current resistance for increased rate applications.

Thus, electrochemical cells constructed with a cathode comprising the mixture of a transition metal phosphate and carbon monofluoride material formulation of the present invention have increased capacity and an improved rate capability. The above detailed description and examples are intended for purposes of illustrating the invention and are not to be construed as limited.

What is claimed is:
1. An electrochemical cell, comprising:
 a) an anode of lithium;
 b) a cathode comprised of a cathode active mixture, the cathode active mixture comprising:
  i) a first cathode active material having a general formula of $Li_xMPO_4$, wherein x=0.01 to 1 and M is selected from the group of elements consisting of Fe, Ni, Co, Mn, and combinations thereof; and
  ii) a second cathode active material selected from $C_2F$ and $CF_x$ with x ranging from 0.1 to 1.9,
  iii) wherein the cathode active mixture has a molar ratio of from 10 to 30 $Li_xMPO_4$ as the first cathode active material to 70 to 90 of the second cathode active material selected from $C_2F$ and $CF_x$; and
 c) a separator disposed between the anode and the cathode to prevent them from direct physical contact with each other; and
 d) an ionically conductive electrolyte activating the anode and the cathode.

2. The electrochemical cell of claim 1, wherein the first and second cathode active materials are characterized as having been prepared by a reaction selected from the group consisting of a thermal treatment, sol-gel formation, chemical vapor deposition, and hydrothermal synthesis of the starting materials.

3. The electrochemical cell of claim 1, wherein the cathode active mixture further comprises a binder material.

4. The electrochemical cell of claim 3, wherein the binder material is a fluoro-resin powder.

5. The electrochemical cell of claim 1, wherein the cathode active mixture further comprises a conductive additive material.

6. The electrochemical cell of claim 5, wherein the conductive additive material is selected from the group consisting of acetylene black, carbon black, graphite, powdered nickel, powdered aluminum, powdered titanium, powdered stainless steel, and combinations thereof.

7. The electrochemical cell of claim 1, wherein the electrolyte comprises a lithium salt selected from the group consisting of $LiPF_6$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof, the lithium salt being dissolved in a nonaqueous solvent.

8. The electrochemical cell of claim 7, wherein the nonaqueous solvent comprises at least one low viscosity solvent selected from the group consisting of tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and at least one high permittivity solvent selected from the group consisting of propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

9. A cathode active mixture for an electrochemical cell, the cathode active mixture comprising:
   a) a first cathode active material having a general formula of $Li_xMPO_4$, wherein x=0.01 to 1 and M is selected from the group of elements consisting of Fe, Ni, Co, Mn, and combinations thereof; and
   b) a second cathode active material selected from $C_2F$ and $CF_x$ with x ranging from 0.1 to 1.9,
   c) wherein the cathode active mixture has a molar ratio of from 10 to 30 $Li_xMPO_4$ as the first cathode active material to 70 to 90 of the second cathode active material selected from $C_2F$ and $CF_x$.

10. The cathode active mixture of claim 9, further comprising a binder material.

11. The cathode active mixture of claim 10, wherein the binder material is a fluoro-resin powder.

12. The cathode active mixture of claim 9, further comprising a conductive additive material.

13. The cathode active mixture of claim 12, wherein the conductive additive material is selected from the group consisting of acetylene black, carbon black, graphite, powdered nickel, powdered aluminum, powdered titanium, powdered stainless steel, and combinations thereof.

14. An A electrochemical cell, comprising:
   a) an anode of lithium;
   b) a cathode comprised of a cathode active mixture, the cathode active mixture comprising:
      i) a first cathode active material selected from the group of lithiated metallic phosphates consisting of lithium iron phosphate ($LiFePO_4$), lithium cobalt phosphate ($LiCoPO_4$), lithium nickel phosphate ($LiNiPO_4$), lithium manganese phosphate ($LiMnPO_4$), and combinations thereof; and
      ii) a second cathode active material selected from $C_2F$ and $CF_x$ with x ranging from 0.1 to 1.9,
      iii) wherein the cathode active mixture comprises from about 70 to 90 weight percent of the lithiated metallic phosphate, the remainder being either $C_2F$ or $CF_x$; and
   c) a separator disposed between the anode and the cathode to prevent them from direct physical contact with each other; and
   d) an ionically conductive electrolyte activating the anode and the cathode.

15. The electrochemical cell of claim 14, wherein the cathode active mixture further comprises a binder material.

16. The electrochemical cell of claim 15, wherein the binder material is a fluoro-resin powder.

17. The electrochemical cell of claim 14, wherein the cathode active mixture further comprises a conductive additive material.

18. The electrochemical cell of claim 17, wherein the conductive additive material is selected from the group consisting of acetylene black, carbon black, graphite, powdered nickel, powdered aluminum, powdered titanium, powdered stainless steel, and combinations thereof.

19. The electrochemical cell of claim 14, wherein the electrolyte comprises a lithium salt selected from the group consisting of $LiPF_6$, $LiAsF_6$, $LiSbF_6$, $LiBF_4$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof, the lithium salt being dissolved in a nonaqueous solvent.

20. The electrochemical cell of claim 19, wherein the nonaqueous solvent comprises at least one low viscosity solvent selected from the group consisting of tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and at least one high permittivity solvent selected from the group consisting of propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

21. A cathode for an electrochemical cell, the cathode comprising:
   a) a cathode current collector; and
   b) a cathode active mixture contacted to the cathode current collector, the cathode active mixture consisting essentially of:
      i) a first cathode active material having a general formula of $Li_xMPO_4$, wherein x=0.01 to 1 and M is selected from the group of elements consisting of Fe, Ni, Co, Mn, and combinations thereof; and
      ii) a second cathode active material selected from $C_2F$ and $CF_x$ with x ranging from 0.1 to 1.9,
      iii) wherein the cathode active mixture has a molar ratio of from 10 to 30 $Li_xMPO_4$ as the first cathode active material to 70 to 90 of the second cathode active material selected from $C_2F$ and $CF_x$.

22. The cathode of claim 21, wherein a fluoro-resin binder material is mixed with the cathode active mixture contacted to the cathode current collector.

23. The cathode of claim 21, wherein a conductive additive material selected from the group consisting of acetylene black, carbon black, graphite, powdered nickel, powdered aluminum, powdered titanium, powdered stainless steel, and combinations thereof is mixed with the cathode active mixture contacted to the cathode current collector.

* * * * *

UNITED STATES PATENT AND TRADEMARK OFFICE
CERTIFICATE OF CORRECTION

PATENT NO. : 10,109,846 B2  
APPLICATION NO. : 14/641836  
DATED : October 23, 2018  
INVENTOR(S) : Arden Johnson and Alexander Kaplan Page 1 of 1

It is certified that error appears in the above-identified patent and that said Letters Patent is hereby corrected as shown below:

Column 9, Line 13 (Claim 7, Line 3), after the word "LiSbF6" insert --LiBF4--

Signed and Sealed this  
Twenty-fifth Day of December, 2018

Andrei Iancu  
*Director of the United States Patent and Trademark Office*